United States Patent
Moran et al.

(10) Patent No.: US 10,677,204 B1
(45) Date of Patent: Jun. 9, 2020

(54) INTAKE PORTS WITH CONNECTING PASSAGE FOR A DIESEL ENGINE

(71) Applicant: GM GLOBAL TECHNOLOGY OPERATIONS LLC, Detroit, MI (US)

(72) Inventors: Robert J. Moran, Ann Arbor, MI (US); Jian Gao, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/454,134

(22) Filed: Jun. 27, 2019

(51) Int. Cl.
| | |
|---|---|
| *F02M 35/108* | (2006.01) |
| *F02M 29/06* | (2006.01) |
| *F02M 35/104* | (2006.01) |
| *F02B 1/12* | (2006.01) |
| *F02B 23/06* | (2006.01) |

(52) U.S. Cl.
CPC ........... *F02M 35/1045* (2013.01); *F02B 1/12* (2013.01); *F02B 23/0624* (2013.01); *F02M 29/06* (2013.01); *F02M 35/108* (2013.01); *F02M 35/1085* (2013.01)

(58) Field of Classification Search
CPC ............ F02M 35/1045; F02M 35/108; F02M 35/1085; F02M 9/10; F02M 21/04; F02M 21/045; F02M 29/06; F02M 2700/4373; F02M 2700/4376; F02B 1/12; F02B 23/0624
See application file for complete search history.

(56) References Cited

U.S. PATENT DOCUMENTS

| | | | | |
|---|---|---|---|---|
| 4,450,793 | A | * | 5/1984 | Sumiyoshi .............. F02B 31/00 123/184.39 |
| 4,991,547 | A | | 2/1991 | Davis et al. |
| 5,129,367 | A | | 7/1992 | Lee et al. |
| 5,765,525 | A | * | 6/1998 | Ma .......................... F02B 17/00 123/308 |
| 6,105,545 | A | | 8/2000 | Breidenbach |
| 7,273,031 | B1 | | 9/2007 | Huebler et al. |
| 7,389,764 | B1 | | 6/2008 | Wickman et al. |
| 7,398,758 | B2 | | 7/2008 | Reuss et al. |
| 7,643,931 | B2 | | 1/2010 | Reuss et al. |
| 8,291,695 | B2 | | 10/2012 | Perry et al. |

(Continued)

FOREIGN PATENT DOCUMENTS

GB 2484747 4/2012

OTHER PUBLICATIONS

U.S. Appl. No. 16/418,566, titled "Intake Ports for a Diesel Engine," filed by GM Global Technology Operations LLC on May 21, 2019.

*Primary Examiner* — Jacob M Amick (57) ABSTRACT

An engine structure configured to a control swirl in a diesel engine combustion chamber and a diesel engine assembly including the engine structure defines first and second intake ports and a connecting passage connecting the first and second intake ports. The first intake port is in fluid communication with the combustion chamber and configured to direct a first intake airflow into the combustion chamber, and the second intake port is in fluid communication with the combustion chamber and configured to direct a second intake airflow into the combustion chamber. The connecting passage connects the first intake port to the second intake port and is defined by the engine structure outside of the combustion chamber.

20 Claims, 6 Drawing Sheets

(56) References Cited

U.S. PATENT DOCUMENTS

| | | | |
|---|---|---|---|
| 8,392,091 B2 | 3/2013 | Hebbale et al. | |
| 8,397,686 B2 | 3/2013 | Davis | |
| 8,443,587 B2 | 5/2013 | Narayanaswamy et al. | |
| 8,555,857 B2 | 10/2013 | Yang et al. | |
| 8,781,713 B2 | 7/2014 | Brennan et al. | |
| 8,960,151 B2 | 2/2015 | Grover et al. | |
| 9,022,003 B2 | 5/2015 | Grover et al. | |
| 9,169,763 B2 | 10/2015 | Atluri et al. | |
| 9,574,522 B2 | 2/2017 | Moran et al. | |
| 10,018,104 B2 | 7/2018 | Grover, Jr. et al. | |
| 2002/0185105 A1* | 12/2002 | Martin | F01L 1/26 123/308 |
| 2019/0368412 A1* | 12/2019 | Lindgren | F02B 31/00 |

* cited by examiner

INTAKE PORTS WITH CONNECTING PASSAGE FOR A DIESEL ENGINE

FIELD

The present disclosure relates to structure defining intake ports within a diesel engine.

INTRODUCTION

In a typical diesel engine for a motor vehicle, the engine includes multiple combustion chambers in which air and fuel are mixed and combustion occurs from the compression of the air and fuel mixture. Generally, one or more intake ports directs airflow into the combustion chamber. As the air flows into the combustion chamber from the intake port(s), a swirl flow pattern of the airflow is generated in the combustion chamber. Such swirl flow patterns result in higher temperature gradients and heat flux during the combustion process, which increases heat loss and reduces the efficiency of the diesel engine at higher speeds. However, at low speeds, high swirl is desirable because the flow rate is low. Therefore, control of swirl flow is desirable to optimize efficiency.

Approaches to control swirl flow have typically included use of intake port throttle valves. However, use of throttle valves increases complexity and requires more packaging space. Thus, there is a need for new and improved systems to efficiently control airflow into a diesel engine combustion chamber while maintaining packaging constraints.

SUMMARY

The present disclosure provides an engine structure defining two intake ports and a connecting passage between the two intake ports. When both intake ports provide a high amount of intake air, swirl is reduced because the airflow through each intake port at least partially counteracts the other and operates to reduce the swirl of the airflow within the combustion chamber. The connecting passage directs some of the air from one intake passage to the other intake passage, and when speed increases, the amount of airflow directed through the connecting passage increases, thereby operating to provide more airflow through the second intake port. Providing more airflow through the second intake port as speed increases operates to counteract the airflow through the first intake port and reduce swirl as speed increases.

In one form, which may be combined with or separate from the other forms disclosed herein, an engine structure configured to control swirl in a diesel engine combustion chamber is provided. The engine structure defines a first intake port in fluid communication with the combustion chamber that is configured to direct a first intake airflow into the combustion chamber. The engine structure further defines a second intake port in fluid communication with the combustion chamber that is configured to direct a second intake airflow into the combustion chamber. The engine structure also defines a connecting passage connecting the first intake port to the second intake port, where the connecting passage is defined by the engine structure outside of the combustion chamber.

In another form, which may be combined with or separate from the other forms disclosed herein, a diesel engine assembly for a motor vehicle is provided. The diesel engine assembly includes an engine structure defining a combustion chamber, a first intake port in fluid communication with the combustion chamber and configured to direct a first intake airflow into the combustion chamber, and a second intake port in fluid communication with the combustion chamber and configured to direct a second intake airflow into the combustion chamber. The engine structure defines a connecting passage connecting the first intake port to the second intake port, the connecting passage being defined by the engine structure outside of the combustion chamber. The engine structure further defines at least one exhaust port in fluid communication with the combustion chamber and configured to direct an exhaust airflow out of the combustion chamber. The diesel engine assembly also includes a piston located within the combustion chamber, a first intake valve supported by the engine structure and selectively opening and closing the first intake port, and a second intake valve supported by the engine structure and selectively opening and closing the second intake port.

Additional features may be provided, including but not limited to the following: the engine structure defining the connecting passage as having a flow area that is smaller than a flow area of the first intake port; the flow area of the connecting passage being smaller than a flow area of the second intake port; wherein the engine structure defining the first intake port is configured to direct the first airflow in a first direction and the engine structure defining the second intake port is configured to direct the second airflow in a second direction, the second direction being different than the first direction; the connecting passage being configured to direct airflow from the first intake port into the second intake port such that a desired swirl ratio is achieved in the combustion chamber, wherein the desired swirl ratio is 1.2 or less; and the engine structure defining the connecting passage having a connecting passage diameter and the engine structure defining the first intake port having an intake port diameter, the connecting passage diameter being no greater than 50% of the intake port diameter.

Further additional features may be provided, including but not limited to the following: a connecting passage valve disposed in fluid communication with the connecting passage and configured to selectively control flow through the connecting passage; the connecting passage valve being disposed within the connecting passage; the connecting passage valve including an electrically actuatable solenoid; the connecting passage valve being a passive valve actuated by pressure; a first intake valve disposed in communication with the first intake port; a second intake valve disposed in communication with the second intake port; and each intake valve having a stem and a plunger.

In further optional aspects, the engine structure may define a Z-axis along the stem of the second intake valve, an X-axis orthogonal to the Z-axis, and a Y-axis orthogonal to the Z-axis and to the X-axis, and the engine structure may define the connecting passage along a connecting passage axis. The connecting passage axis may be disposed along a first angle in the range of 0 to 45 degrees with respect to the Z-axis within an X-Z plane defined by the X-axis and the Z-axis, and the connecting passage axis may be disposed along a second angle in the range of 0 to 45 degrees with respect to the Z-axis within a Y-Z plane defined by the Y-axis and the Z-axis. In some variations, the first angle may be in the range of 25 to 30 degrees with respect to the Z-axis in the X-Z plane, and the second angle may be in the range of 12 to 18 degrees with respect to the Z-axis in the Y-Z plane.

In other optional aspects, the connecting passage may be defined to have a diameter in the range of 9-11 millimeters and each of the first and second intake ports may be defined to have diameters in the range of 25-35 millimeters. The engine cylinder assembly may further comprise an engine block defining a cylinder bore that defines portions of the combustion chamber. The cylinder bore may have a diameter in the range of 90-110 millimeters, by way of example.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
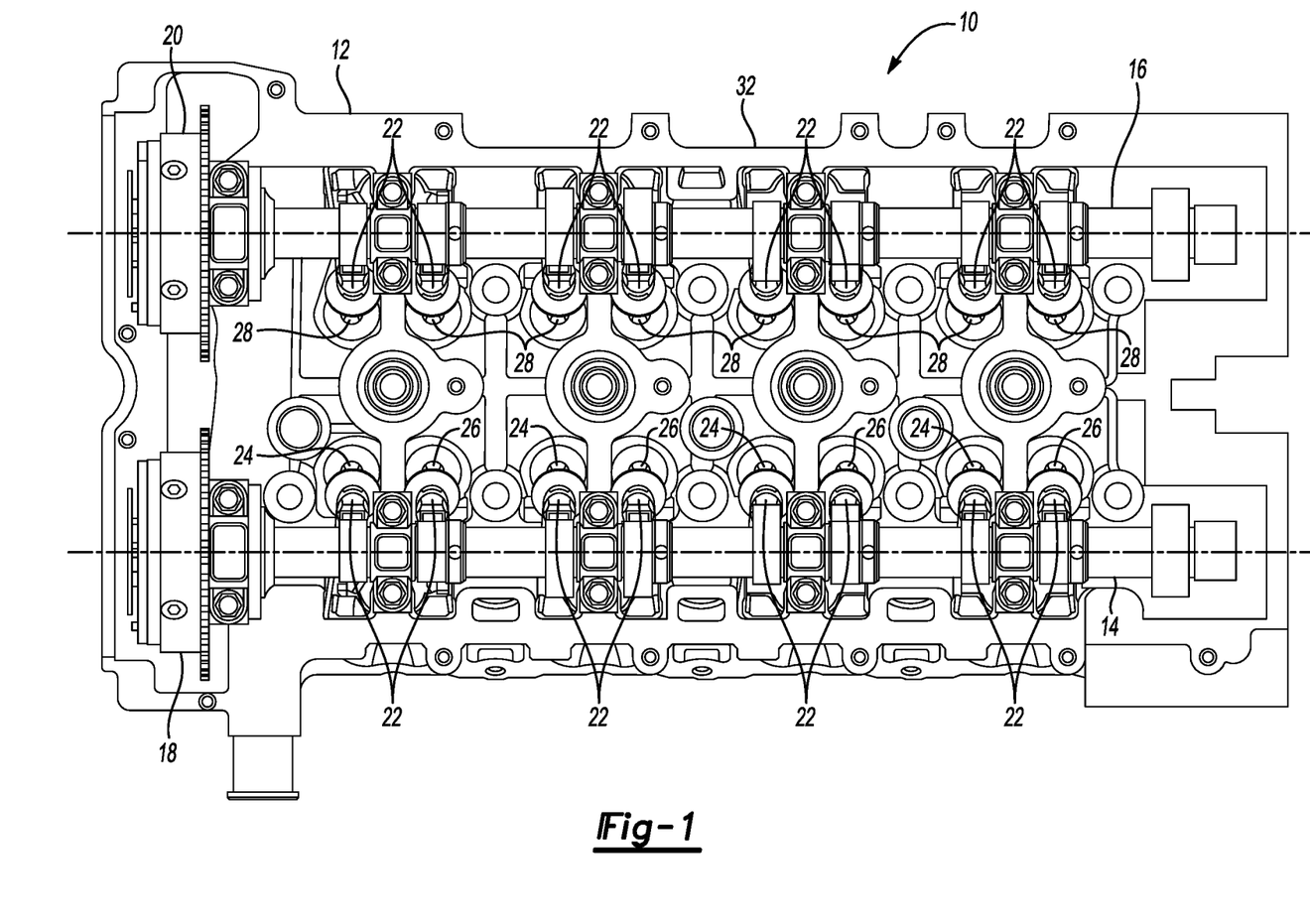
FIG. 1 is a plan view of a diesel engine assembly, according to the principles of the present disclosure.
Figure 2:
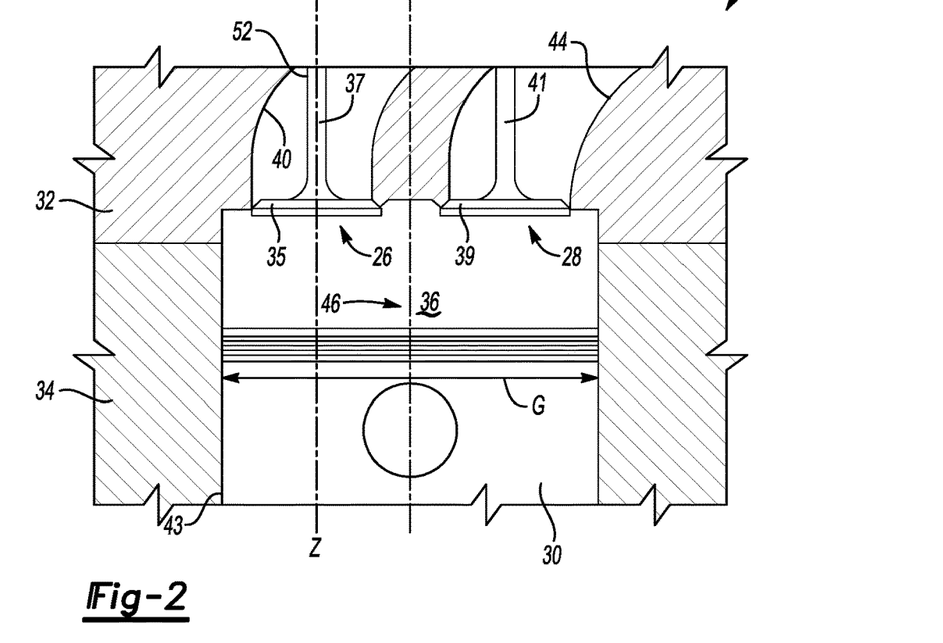
FIG. 2 is a schematic cross-sectional view of portions of the diesel engine assembly of FIG. 1, in accordance with the principles of the present disclosure.

With reference to FIGS. 1-2, a diesel engine assembly 10 is illustrated. The diesel engine assembly 10 may include an engine structure 12, intake and exhaust camshaft assemblies 14, 16 rotationally supported on the engine structure 12, intake and exhaust cam phasers 18, 20, valve lift assemblies 22, first and second intake valves 24, 26, exhaust valves 28, pistons 30. Each intake valve 24, 26 has a plunger 35 and a stem 37, and each exhaust valve has a plunger 39 and a stem 41. In the present non-limiting example, the engine assembly 10 is shown as a dual overhead camshaft engine with the engine structure 12 including a cylinder head 32 rotationally supporting the intake and exhaust camshaft assemblies 14, 16. The engine structure 12 may additionally include an engine block 34 cooperating with the cylinder head 32 and the pistons 30 to define combustion chambers 36 within cylinder bores 43 (see FIG. 2).

Figure 3:
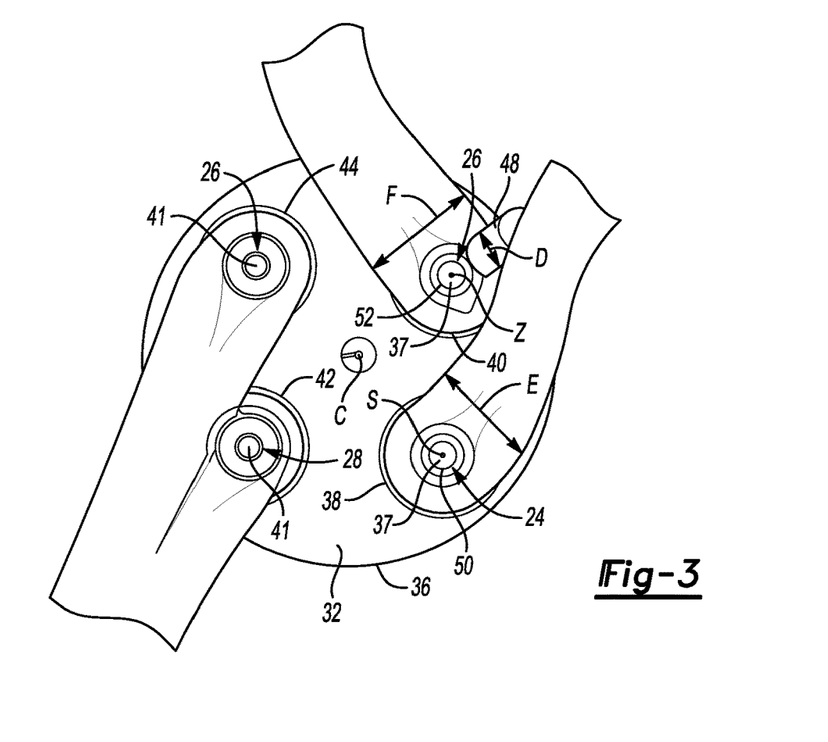
FIG. 3 is a schematic "reverse" plan view of intake and exhaust ports, including a connecting passage between the intake ports, and a combustion chamber of the diesel engine assembly of FIGS. 1 and 2, according to the principles of the present disclosure, where "reverse" refers to the fact that the void portions of the diesel engine structure are illustrated in FIG. 3.
Figure 4:
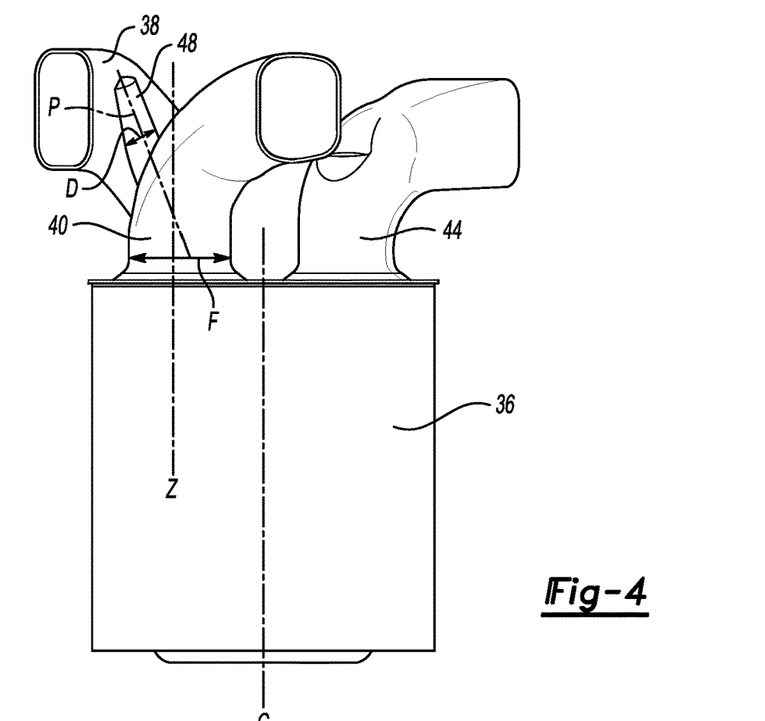
FIG. 4 is a schematic "reverse" side view of the intake and exhaust ports, the connecting passage, and the combustion chamber shown in FIG. 3, according to the principles of the present disclosure.
Figure 5:
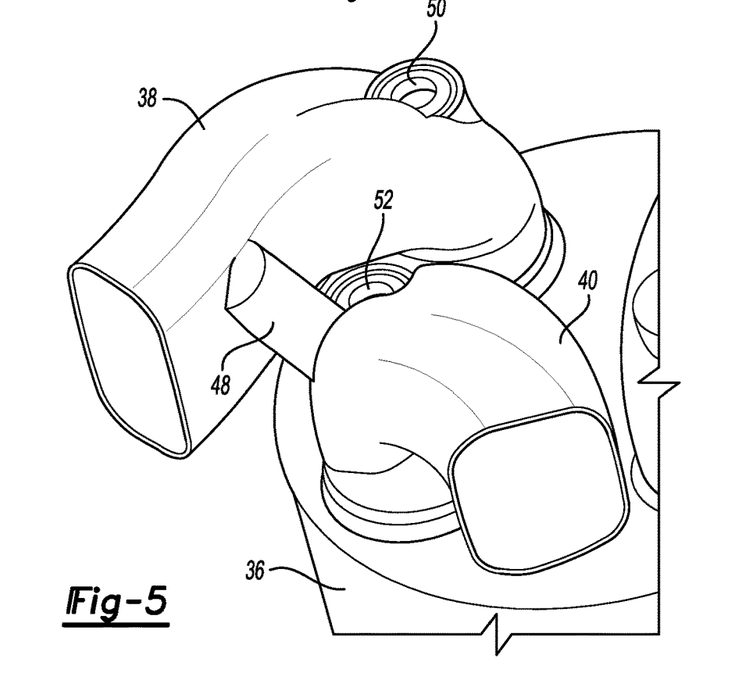
FIG. 5 is a schematic "reverse" perspective view of a first side of the intake ports, the connecting passage, and a portion of the exhaust port and the combustion chamber shown in FIGS. 3 and 4, according to the principles of the present disclosure.
Figure 6:
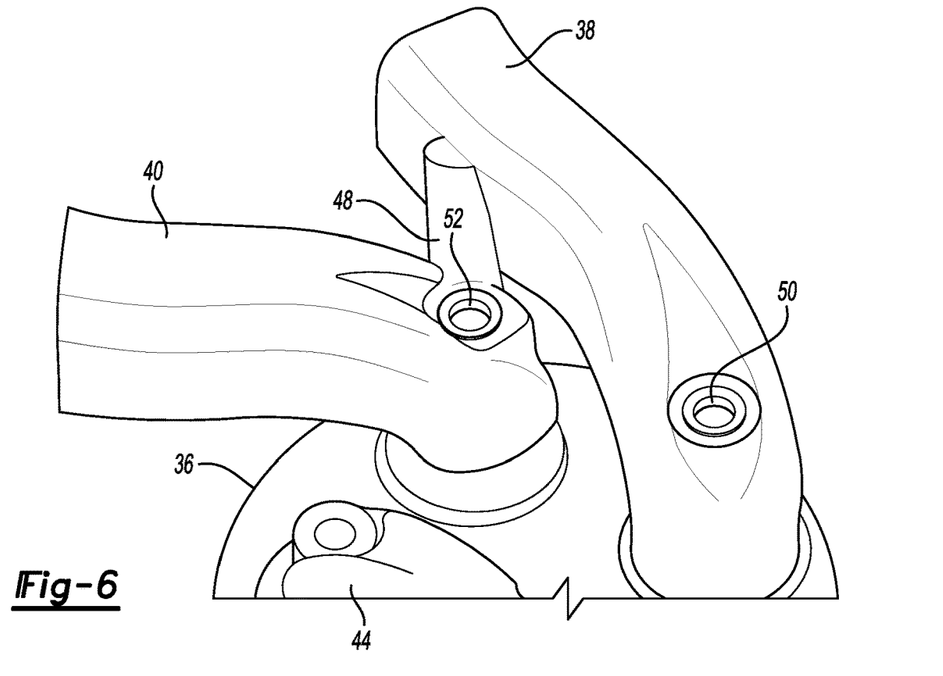
FIG. 6 is a schematic "reverse" perspective view of a second side of the intake ports, the connecting passage, and a portion of the exhaust port and the combustion chamber shown in FIGS. 3-5, according to the principles of the present disclosure.
Figure 7:
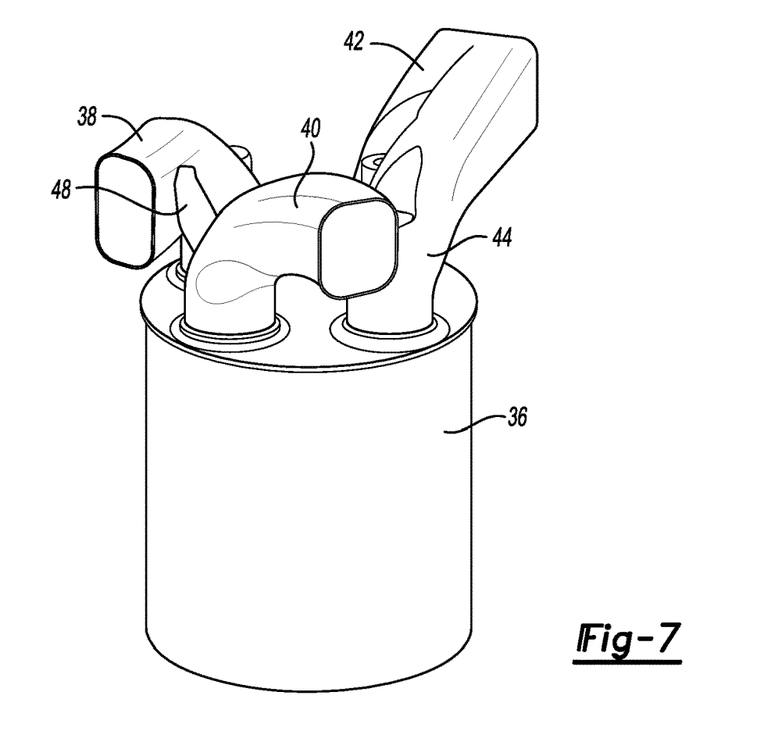
FIG. 7 is a schematic "reverse" perspective view of the intake and exhaust ports, the connecting passage, and the combustion chamber shown in FIGS. 3-6, according to the principles of the present disclosure.

Referring now to FIGS. 2 and 3, and with continued to reference to FIG. 1, it should be understood that FIG. 3 is a "negative" view of the void areas within the engine structure 12. The cylinder head 32 of the engine structure 12 may define first and second intake ports 38, 40 and first and second exhaust ports 42, 44 for each combustion chamber 36. The valve lift assemblies 22 may be engaged with the first intake valves 24, the second intake valves 26, and the exhaust valves 28 to open the first and second intake ports 38, 40 and the first and second exhaust ports 42, 44. Specifically, the first intake valves 24 may open and close the first intake ports 38, and the second intake valves 26 may open and close the second intake ports 40. Thus, the first and second intake ports 38, 40 are in fluid communication with the combustion chamber 36 and are configured to direct intake airflow into the combustion chamber 36. The cylinder head 32 of the engine structure 12 further defines a connecting passage 48 connecting the first intake port 38 to the second intake port 40.

Accordingly, the engine structure 12, and specifically the cylinder head 32 defining the intake ports 38, 40 and the connecting passage 48 is configured to control swirl in the combustion chamber 36. The intake ports 38, 40 and the connecting passage 48 are arranged through the cylinder head 32 in a configuration that adapts to various packaging constraints such as, for example, bolts, water jackets and/or glow plugs.

The stems 37 of the intake valves 24, 26 extend into intake ports 38, 40 through passageways 50, 52 formed within the cylinder head 32 or other parts of the engine structure 12. The stems 37 of the intake valves 24, 26 are disposed along intake valve axes, which are labeled as axis S for the first intake valve 24 disposed in the first intake port 38, and axis Z for the second intake valve 26 disposed in the second intake port 40. In the illustrated example, the intake valve axes S, Z are parallel to or substantially parallel to the central axis C of the cylinder bore 43, but the intake valve axes S, Z could be disposed at other angles with respect to the central axis C, if desired.

Referring now to FIGS. 4-7, and with continued to reference to FIG. 1-3, it should be understood that, like FIG. 3, FIGS. 4-7 also provide "negative" or "reverse" views of the void areas within the engine structure 12, as the ports 38, 40, 42, 44, the connecting passage 48, and the combustion chamber 36 are all void spaces surrounded by engine structure 12 that defines their precise shapes.

The connecting passage 48 is not formed by or within the combustion chamber 36, but rather, the connecting passage 48 is defined outside of the combustion chamber 36 in the engine structure 12, such as within the cylinder head 32. In the illustrated example, the connecting passage 48 has a flow area that smaller a flow area of the first intake port 38 and a flow area of the second intake port 40. For example, in one variation, the connecting passage 48 is defined to have a diameter D in the range of 9-11 millimeters and each of the first and second intake ports are defined to have diameters E, F in the range of 25-35 millimeters. As such, the diameter D and associated flow area through the connecting passage 48 is less than half of the diameter E, F and associated flow areas of each of the intake ports 38, 40. Thus, in some examples, the connecting passage diameter D is no greater than 50% of either of the intake port diameters E, F. By contrast, in this example, the cylinder bore 43 has a diameter G in the range of 90-110 millimeters.

Referring now to FIGS. 8 and 8A-8C, and with continued reference to FIGS. 1-7, as stated above, the engine structure 12 defines the S-axis along the stem 37 of the first intake valve 24 and the Z-axis along the stem 37 of the second intake valve 26. The engine structure 12 defines an X-axis as being orthogonal to the Z-axis, and a Y-axis orthogonal to the Z-axis and to the X-axis. The engine structure 12 defines the connecting passage 48 along a connecting passage axis P that is disposed along a first angle A with respect to the Z-axis within an X-Z plane defined by the X-axis and the Z-axis (see FIGS. 8A and 8B). The angle A may be in the range of 0 to 45 degrees. Thus, in some examples, where the angle A is zero, the connecting passage P may be parallel to or colinear with the Z-axis.

Figures 8, 8A, 8B, 8C:
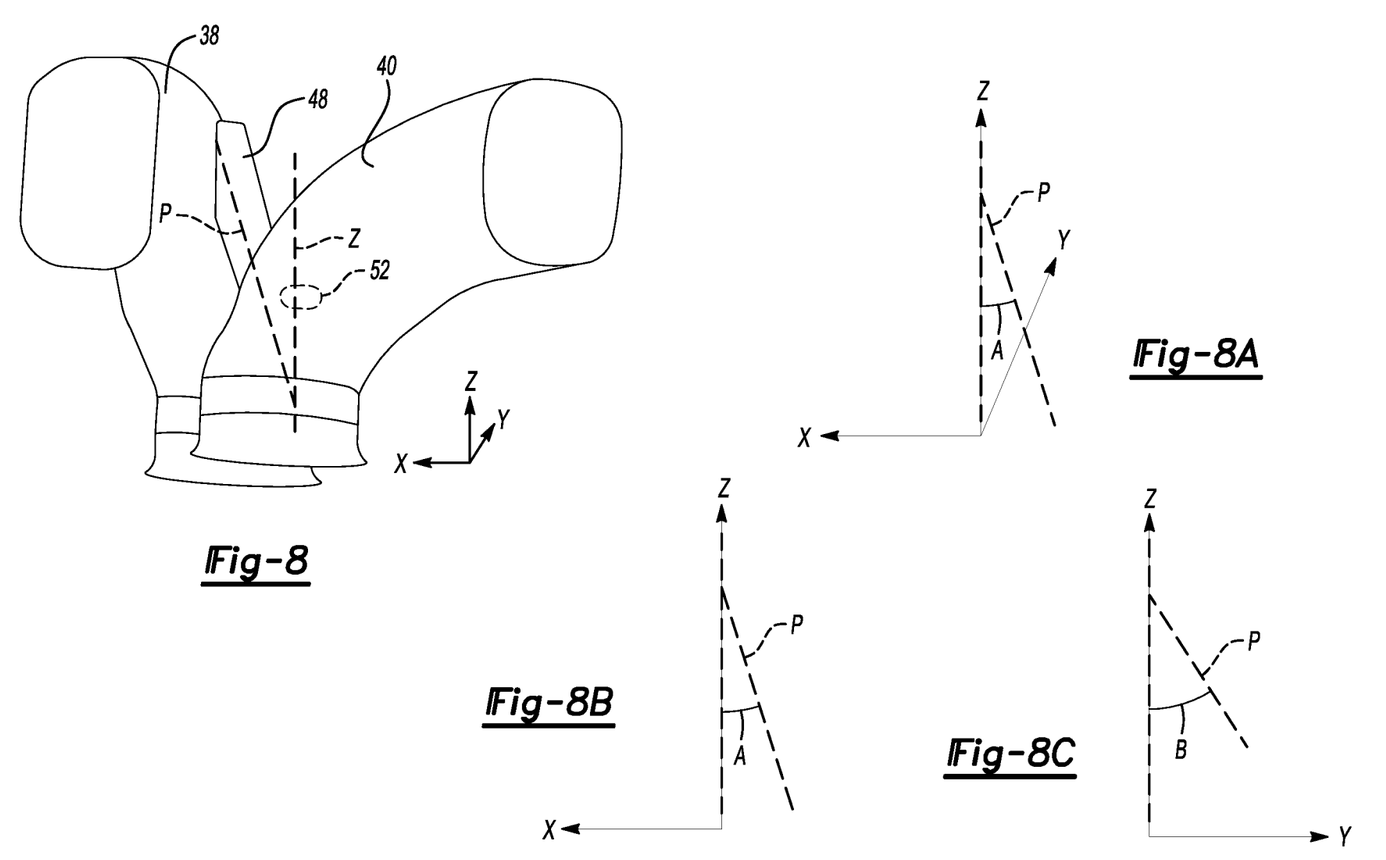
FIG. 8 is a schematic "reverse" perspective view of the intake ports and the connecting passage shown in FIGS. 3-7, illustrated within an X-Y-Z coordinate system, according to the principles of the present disclosure.
FIG. 8A is a graph illustrating axes of an intake valve and the connecting passage of the diesel engine assembly of FIGS. 1-8, in the X-Y-Z coordinate system, in accordance with the principles of the present disclosure.
FIG. 8B is a graph illustrating the axes of the intake valve and the connecting passage of FIGS. 3-8, projected in an X-Z plane of the X-Y-Z coordinate system of FIGS. 8A-8B, according to the principles of the present disclosure.
FIG. 8C is a graph illustrating the axes of the intake valve and the connecting passage of FIGS. 3-8, projected in a Y-Z plane of the X-Y-Z coordinate system of FIGS. 8A-8B, according to the principles of the present disclosure.

In this example, the connecting passage axis P is disposed along a second angle B with respect to the Z-axis within a Y-Z plane defined by the Y-axis and the Z-axis (see FIG. 8C). The angle B may be in the range of 0 to 45 degrees. Thus, in some examples, where the angle B is zero, the connecting passage P may be parallel to or colinear with the Z-axis.

In one example, the angle A is in the range of 25 to 30 degrees with respect to the Z-axis in the X-Z plane, and the second angle B is in the range of 12 to 18 degrees with respect to the Z-axis in the Y-Z plane.

The first intake port 38 directs an airflow into the combustion chamber 36 through the cylinder head 32, and the second intake port 40 also directs an airflow into the combustion chamber 36 through the cylinder head 32. The intake ports 38 and 40 are generally arranged to direct the two airflows to achieve a desired swirl ratio in the combustion chamber 36, with the aid of the connecting passage 48.

Swirl ratio is defined by the following equation:

$$\text{Swirl ratio} = \frac{\text{speed of air rotation in cylinder}}{\text{engine speed}} \quad (1)$$

In some variations, the engine structure 12 defining the first intake port 38 is configured to direct a first airflow in a first direction, and the engine structure 12 defining the second intake port 40 is configured to direct a second airflow in a second direction, the second direction being different than the first direction. In this variation, the connecting passage 48 is configured to direct airflow from the first intake port 38 into the second intake port 40 such that a desired swirl ratio of 1.2 or less is achieved in the combustion chamber 36.

As the engine speed increases, the air intake through the intake ports 38, 40 also increases. While a high swirl ratio, such as greater than 2, may be desirable or acceptable at lower speeds due to the low flow rate, high swirl ratios at higher speeds is often undesirable because the fuel is not optimally mixed with the air, and greater losses, such as heat loss, are experienced. Therefore, the second intake port 40 may be arranged to provide airflow into the combustion chamber 36 that at least partially counteracts the airflow into the combustion chamber 36 from the first intake port 38.

The addition of the connecting passage 48 from the first intake port 38 to the second intake port 40 results in a diversion of some of the airflow through the first intake port 38 into the second intake port 40. As such, the airflow through the second intake port 40 is increased, and due to the higher airflow at higher speeds, the airflow through the connecting passage 48 into the second intake port 40 is increased as the speed increases. The result is that the swirl ratio is reduced because more airflow enters the combustion chamber 36 through the second intake port 40 to counteract the airflow through the first intake port 36.

Figure 9A:
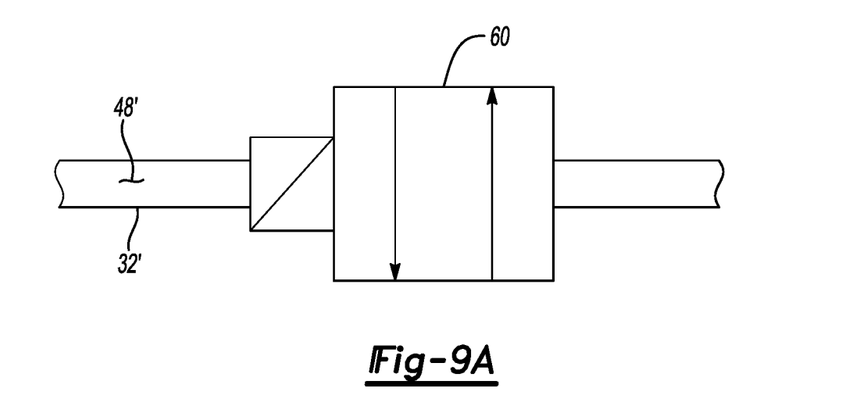
FIG. 9A is a schematic illustration of another variation of the connecting passage of the diesel engine assembly of FIGS. 1-2, including a connecting passage valve, in accordance with the principles of the present disclosure.

Referring now to FIG. 9A, another variation of the structure 32' forming the connecting passage 48' is schematically illustrated and designated with prime symbols to indicate that the structure 32' forming the connecting passage 48' has some differences from the structure 32 forming the connecting passage 48 described above. It should be understood that the structure 32' forming the connecting passage 48' may be the same as the structure 32 and connecting passage 48 described above with respect to FIGS. 2-8C, except where described as being different.

In this variation, a connecting passage valve 60 is disposed in fluid communication with the connecting passage 48', which is configured to selectively control flow through the connecting passage 48'. In contrast, the connecting passage 48 described above had no valve disposed within the connecting passage 48 or disposed so as to control flow through the connecting passage 48.

As shown, the connecting passage valve 60 may be disposed within the connecting passage 48'. In this example, the connecting passage valve 60 includes an electrically actuatable solenoid that may be actively controlled. As such, precise control over the flow through the connecting passage 48', and the resulting swirl ratio, may be accurately achieved. In the alternative to a valve actuatable by an electrically actuatable solenoid, the valve 60 may be any other type of actively-controlled valve.

Figure 9B:
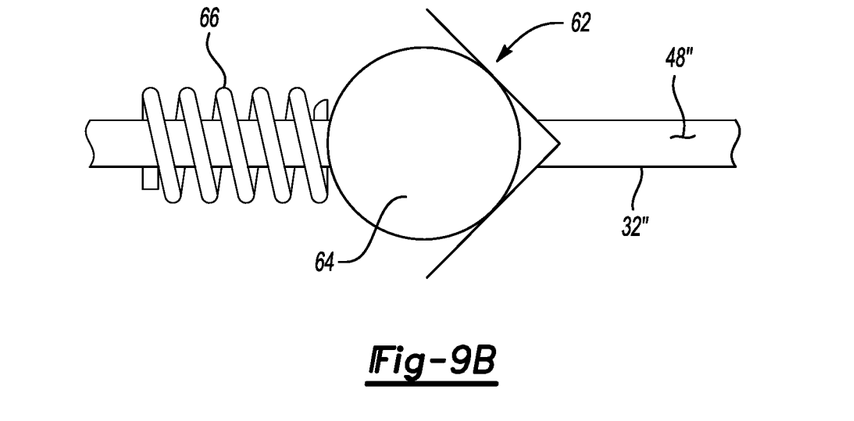
FIG. 9B is a schematic illustration of yet another variation of the connecting passage of the diesel engine assembly of FIGS. 1-2, including another variation of a connecting passage valve, in accordance with the principles of the present disclosure.

Referring now to FIG. 9B, yet another variation of the structure 32" forming the connecting passage 48" is schematically illustrated and designated with double-prime symbols to indicate that the structure 32" forming the connecting passage 48" has some differences from the structures 32, 32' forming the connecting passages 48, 48' described above. It should be understood that the structure 32" forming the connecting passage 48" may be the same as the structures 32, 32' and connecting passages 48, 48' described above with respect to FIGS. 2-9A, except where described as being different.

Like the variation shown in FIG. 9A, in this variation shown in FIG. 9B, a connecting passage valve 62 is disposed in fluid communication with the connecting passage 48", which is configured to selectively control flow through the connecting passage 48″. As shown, the connecting passage valve 62 may be disposed within the connecting passage 48″. In this example, the connecting passage valve 62 is a passage valve, which may include, for example, a ball 64 and a spring 66. The passive valve 62 is actuated by pressure, for example, pressure within the connecting passage 48″ or within the first intake port 38, depending on the placement of the passive valve 62. When pressure exceeds a predetermine threshold, the ball 64 is compressed against the spring 66, and air flows through the connecting passage 48″. In the alternative, any other type of passive valve may be used. As such, control over the flow through the connecting passage 48″ is achieved based on pressure, and the resulting swirl ratio is thereby controlled.

Intake ports for diesel engines according to present disclosure offers several advantages. These include providing a larger region on the cylinder head for various packaging constraints such as, for example, bolts, water jackets and/or glow plugs. Further, such intake ports enable an efficient arrangement to obtain low swirl ratios with a combustion chamber of a diesel engine.

In the claims and specification, certain elements are designated as "first" and "second". These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An engine structure configured to control swirl in a diesel engine combustion chamber, the engine structure defining:
    a first intake port in fluid communication with the combustion chamber and configured to direct a first intake airflow into the combustion chamber;
    a second intake port in fluid communication with the combustion chamber and configured to direct a second intake airflow into the combustion chamber; and
    a connecting passage connecting the first intake port to the second intake port, the connecting passage being defined by the engine structure outside of the combustion chamber.

2. The engine structure of claim 1, the connecting passage having a flow area that is smaller than a flow area of the first intake port and a flow area of the second intake port.

3. The engine structure of claim 1, wherein the engine structure defining the first intake port is configured to direct the first airflow in a first direction, the engine structure defining the second intake port being configured to direct the second airflow in a second direction, the second direction being different than the first direction, the connecting passage being configured to direct airflow from the first intake port into the second intake port such that a desired swirl ratio is achieved in the combustion chamber, wherein the desired swirl ratio is 1.2 or less.

4. The engine structure of claim 2, the engine structure defining the connecting passage having a connecting passage diameter and the engine structure defining the first intake port having an intake port diameter, the connecting passage diameter being no greater than 50% of the intake port diameter.

5. An engine cylinder assembly comprising the engine structure of claim 1, and further comprising a connecting passage valve disposed in fluid communication with the connecting passage and configured to selectively control flow through the connecting passage.

6. The engine cylinder assembly of claim 5, the connecting passage valve being disposed within the connecting passage.

7. The engine cylinder assembly of claim 5, wherein the connecting passage valve includes an electrically actuatable solenoid.

8. The engine cylinder assembly of claim 5, wherein the connecting passage valve is a passive valve actuated by pressure.

9. An engine cylinder assembly comprising the engine structure of claim 4, and further comprising:
    a first intake valve disposed in communication with the first intake port; and
    a second intake valve disposed in communication with the second intake port, the second intake valve having a stem and a plunger, the engine structure defining a z-axis along the stem of the second intake valve, an x-axis orthogonal to the z-axis, and a y-axis orthogonal to the z-axis and the x-axis, the engine structure defining the connecting passage along a connecting passage axis that is disposed along a first angle in the range of 0 to 45 degrees with respect to the z-axis within an x-z plane defined by the x-axis and the z-axis, the connecting passage axis being disposed along a second angle in the range of 0 to 45 degrees with respect to the z-axis within a y-z plane defined by the y-axis and the z-axis.

10. The engine cylinder assembly of claim 9, the first angle being in the range of 25 to 30 degrees with respect to the z-axis in the x-z plane, and the second angle being in the range of 12 to 18 degrees with respect to the z-axis in the y-z plane.

11. The engine cylinder assembly of claim 10, wherein the connecting passage is defined to have a diameter in the range of 9-11 millimeters and each of the first and second intake ports are defined to have diameters in the range of 25-35 millimeters, the engine cylinder assembly further comprising an engine block defining a cylinder bore that defines portions of the combustion chamber, the cylinder bore having a diameter in the range of 90-110 millimeters.

12. A diesel engine assembly for a motor vehicle, the diesel engine assembly comprising:
    an engine structure defining:
        a combustion chamber;
        a first intake port in fluid communication with the combustion chamber and configured to direct a first intake airflow into the combustion chamber;
        a second intake port in fluid communication with the combustion chamber and configured to direct a second intake airflow into the combustion chamber;
        a connecting passage connecting the first intake port to the second intake port, the connecting passage being defined by the engine structure outside of the combustion chamber; and
        at least one exhaust port in fluid communication with the combustion chamber and configured to direct an exhaust airflow out of the combustion chamber; and a piston located within the combustion chamber;

a first intake valve supported by the engine structure and selectively opening and closing the first intake port; and a second intake valve supported by the engine structure and selectively opening and closing the second intake port.

13. The diesel engine assembly of claim 12, the connecting passage having a flow area that is smaller than a flow area of the first intake port and a flow area of the second intake port.

14. The diesel engine assembly of claim 12, wherein the engine structure defining the first intake port is configured to direct the first airflow in a first direction, the engine structure defining the second intake port being configured to direct the second airflow in a second direction, the second direction being different than the first direction, the connecting passage being configured to direct airflow from the first intake port into the second intake port such that a desired swirl ratio is achieved in the combustion chamber, wherein the desired swirl ratio is 1.2 or less.

15. The diesel engine assembly of claim 13, the engine structure defining the connecting passage having a connecting passage diameter and the engine structure defining the first intake port having an intake port diameter, the connecting passage diameter being no greater than 50% of the intake port diameter.

16. The diesel engine assembly of claim 13, further comprising a connecting passage valve disposed in fluid communication with the connecting passage and configured to selectively control flow through the connecting passage.

17. The diesel engine assembly of claim 16, the connecting passage valve being disposed within the connecting passage.

18. The diesel engine assembly of claim 16, wherein the connecting passage valve includes an electrically actuatable solenoid.

19. The diesel engine assembly of claim 16, wherein the connecting passage valve is a passive valve actuated by pressure.

20. The diesel engine assembly of claim 12, each intake valve comprising a stem and a plunger, the engine structure defining a z-axis along the stem of the second intake valve, an x-axis orthogonal to the z-axis, and a y-axis orthogonal to the z-axis and the x-axis, the engine structure defining the connecting passage along a connecting passage axis that is disposed along a first angle in the range of 0 to 45 degrees with respect to the z-axis within an x-z plane defined by the x-axis and the z-axis, the connecting passage axis being disposed along a second angle in the range of 0 to 45 degrees with respect to the z-axis within a y-z plane defined by the y-axis and the z-axis.

\* \* \* \* \*